(12) United States Patent
Chuang (10) Patent No.: US 7,035,089 B2
(45) Date of Patent: Apr. 25, 2006

(54) PORTABLE ELECTRONIC DEVICE WITH HIDDEN KEYBOARD

(75) Inventor: Tsung-Jen Chuang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/849,161

(22) Filed: May 20, 2004

(65) Prior Publication Data
US 2005/0105256 A1    May 19, 2005

(30) Foreign Application Priority Data
Nov. 13, 2003  (CN) .......................... 2003 2 103998

(51) Int. Cl.
*G06F 1/16* (2006.01)
(52) U.S. Cl. .................... 361/680; 248/298.1; 400/489
(58) Field of Classification Search ........ 361/679–687, 361/724–727; 400/489; 248/441.1, 298.1; 108/93; 84/179
See application file for complete search history.

(56) References Cited

U.S. PATENT DOCUMENTS

| 5,734,548 A | * | 3/1998 | Park ........................... 361/680 |
| 5,800,085 A | * | 9/1998 | Lee ............................ 400/489 |
| 6,556,430 B1 | * | 4/2003 | Kuo et al. .................. 361/680 |

* cited by examiner

*Primary Examiner*—Hung Van Duong
(74) *Attorney, Agent, or Firm*—Birch, Stewart, Kolasch & Birch, LLP (57) ABSTRACT

A portable electronic device with a hidden keyboard has a portable electronic device body, a keyboard body and a pair of pivotal shafts. The portable electronic device body has an indentation portion formed in a rear thereof and a pair of pivotal holes formed thereon near a lower end of the indentation portion. The keyboard body has two keyboard half portions separate from each other. The pivotal shafts are connected between the pivotal holes of the indentation portion and inner upper corner positions of the keyboard half portions, respectively.

17 Claims, 9 Drawing Sheets

PORTABLE ELECTRONIC DEVICE WITH HIDDEN KEYBOARD

This Nonprofessional application claims priority under 35 U.S.C. § 119(a) on Patent Application No(s). 200320103998.5 filed in CHINA on Nov. 13, 2003, the entire contents of which are hereby incorporated by reference.

BACKGROUND OF THE INVENTION

1. Field of the Invention

The present invention relates to a portable electronic device with a hidden keyboard and, more particularly to a portable electronic device, such as a personal digital assistant (PDA), the keyboard of which is folded away when not in use, and unfolded to allow typewritten input.

2. Description of the Related Art

In general, a personal digital assistant (PDA) typically provides a writing area on the touch-sensitive screen that responds to a writing instrument. Further, a conventional external keyboard specially designed for PDAs can be attached for users who are not used to entering data with a pen-like writing instrument on the screen; they can instead use the keyboard for effective data entry. Nonetheless, the manufacturers of PDAs and external keyboards have not established a common standard to ensure compatibility between these two devices, and thus a keyboard may not always be compatible with any PDA.

Figure 1:
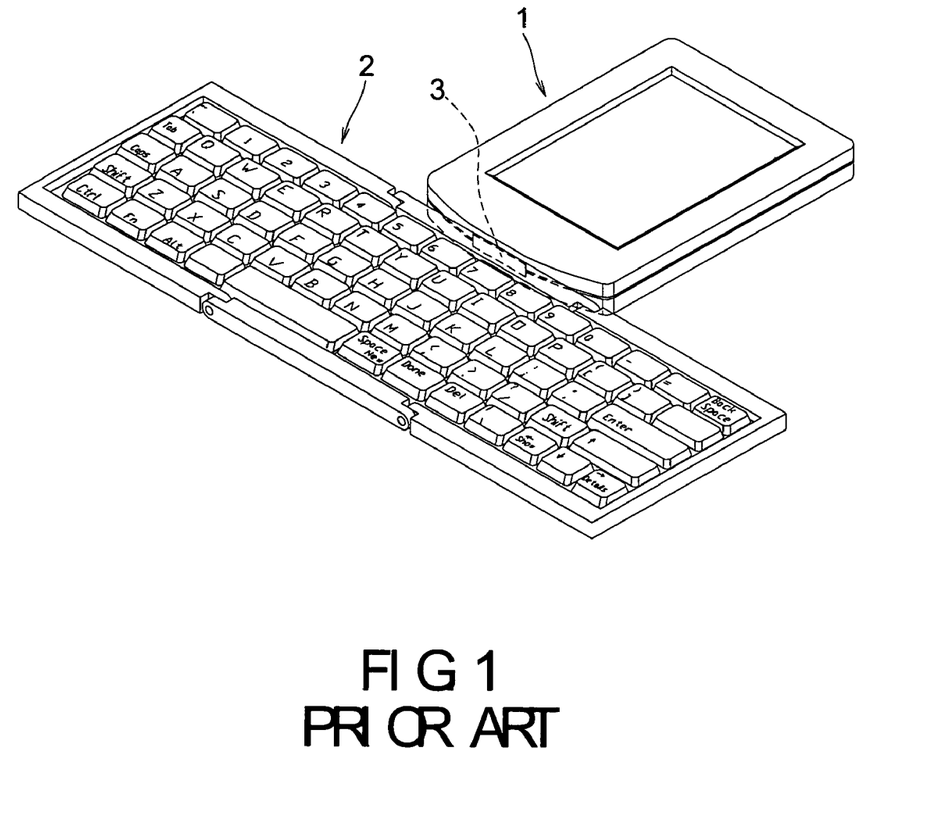
FIG. 1 is a perspective view of a portable electronic device with an external keyboard of a prior art.

A conventional portable electronic device 1, such as a personal digital assistant (PDA), as shown in FIG. 1, is attached to an external keyboard 2 through a connector 3 thereof. However, it is not convenient to carry the external keyboard 2 in use.

Figure 2:
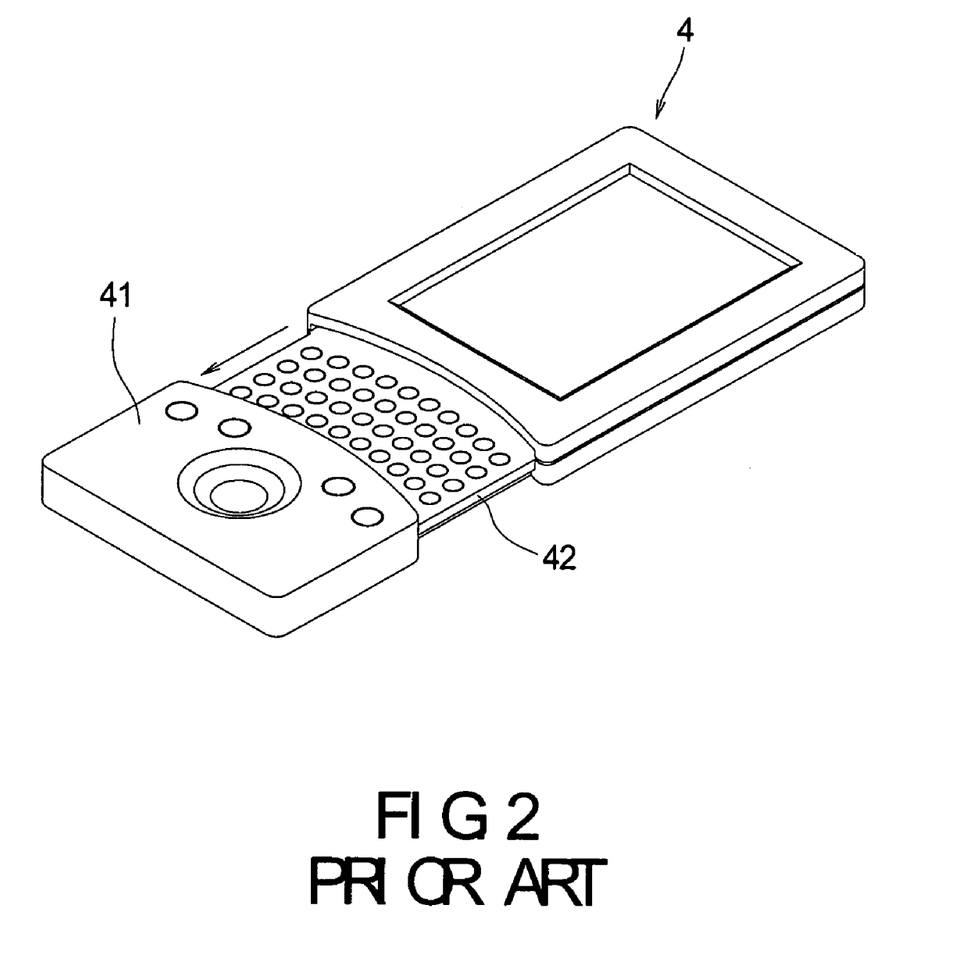
FIG. 2 is a perspective view of a portable electronic device with a built-in keyboard of the present invention.

FIG. 2 shows another portable electronic device 4 providing a sliding cover 41 and a built-in keyboard 42 exposed by downward movement of the sliding cover 41. However, the outward appearance and size of the portable electronic device are influenced, so the keys are smaller due to the volume limitation of the keyboard 42. Further, if the keyboard layout and key size are too small, operation thereof is inconvenient and impractical.

SUMMARY OF THE INVENTION

It is therefore a principal object of the invention to provide a portable electronic device with a hidden keyboard, which can be folded into two keyboard half portions built in a portable electronic device body to be hidden therein, and hence do not influence the outward appearance and size of the portable electronic device when not in use. When unfolded for use, keys on the keyboard are larger and thus easier to operate. Furthermore, the present invention has been accomplished to eliminate the aforesaid problems.

To achieve the above object, the present invention provides a portable electronic device with a hidden keyboard, in which the portable electronic device with the hidden keyboard includes a portable electronic device body, a keyboard body and a pair of pivotal shafts. The portable electronic device body has an indentation portion formed in a rear thereof and has a pair of pivotal holes formed thereon near a lower end of the indentation portion. The keyboard body has two keyboard half portions separated from each other. The pivotal shafts are connected between the pivotal holes of the portable electronic device body and inner upper corner positions of the keyboard half portions, respectively. To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

With reference to FIGS. 3 to 10, the present invention provides a portable electronic device with a hidden keyboard, in which the portable electronic device includes a portable electronic device body 5, a keyboard body 6 and a pair of pivotal shafts 7. The keyboard body 6 is pivotally connected to a rear of the portable electronic device body 5 (such as a personal digital assistant, PDA) via the pair of pivotal shafts 7, so that the keyboard body 6 can be folded to hide in the rear of the portable electronic device body 5 when not in use, and it can be unfolded for use when the convenience of typewritten input is desired.

Figure 3:
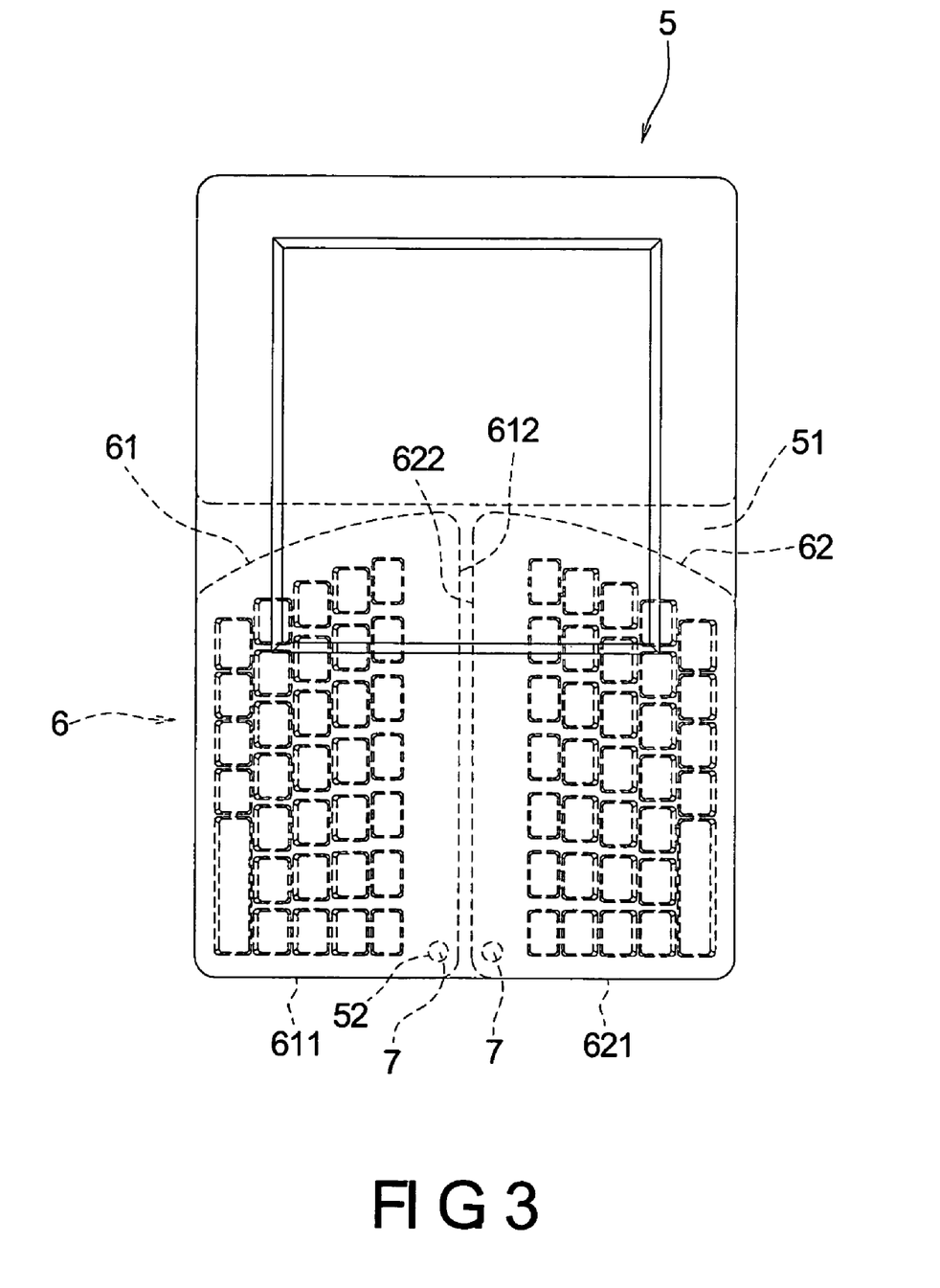
FIG. 3 is a front view of the present invention when the keyboard is folded and hidden.
Figure 4:
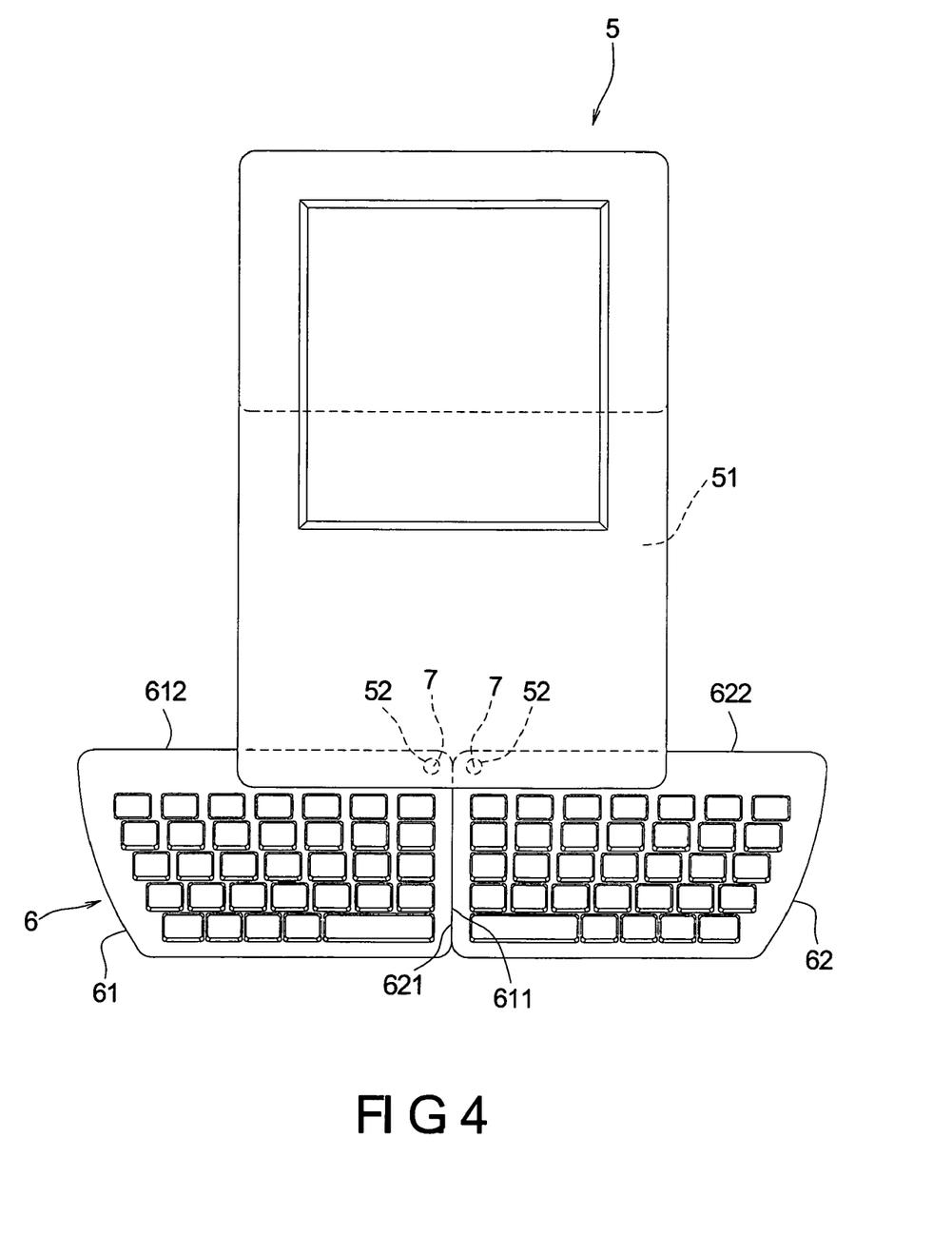
FIG. 4 is a front view of the present invention when the keyboard is unfolded for use.

Referring now to FIGS. 3 and 4, the portable electronic device body 5 has an indentation portion 51 formed in a rear thereof and a pair of pivotal holes 52 formed thereon near to a lower end of the indentation portion 51. The keyboard body 6 has two keyboard half portions 61, 62 separated from each other, and two separating edges 611, 621 (shown in FIG. 4) and two upper edges 612, 622 are defined on the two keyboard half portions 61, 62. Each of the pivotal shafts 7 has two shaft ends; one shaft end is fastened to the inner upper corner position of the keyboard half portion, and another shaft end is pivotally connected to the pivotal holes 52 of the portable electronic device body 5 for unfolding the two keyboard half portions 61, 62. The two keyboard half portions 61, 62 are received within the indentation portion 51 of the portable electronic device body 5. When in use, the two keyboard half portions 61, 62 of the keyboard body 6 are unfolded out in a direction relative to the pivotal shaft 7 (shown in FIG. 4), so that the two separating edges 611, 621 abut each other to be assembled into a larger keyboard layout and key size (such as a qwerty-type keyboard). When not in use, the two keyboard half portions 61, 62 of the keyboard body 6 are folded into the indentation portion 51 in an opposite direction relative to the pivotal shaft 7 (shown in FIG. 3). After folding, the two upper edges 612, 622 of the keyboard half portions 61, 62 abut each other to hide the keyboard half portions 61, 62, thus not influencing the outside appearance and size of the portable electronic device body 5.

Figure 5:
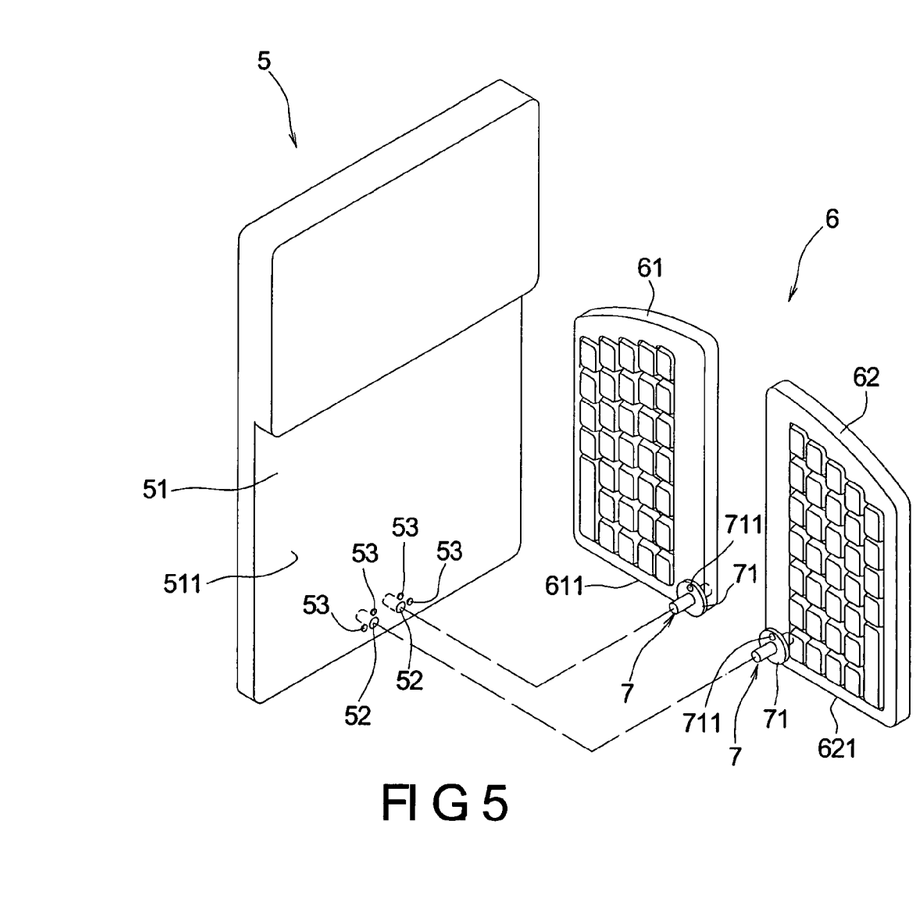
FIG. 5 is a rear exploded view illustrating an exemplary embodiment of a positioning mechanism in accordance with the present invention.

FIG. 5 is a rear exploded view illustrating an exemplary embodiment of a positioning mechanism in accordance with the present invention. The indentation portion 51 of the portable electronic device body 5 has a wall face 511, and the pivotal holes 52 are formed in the wall face 511. The positioning mechanism includes two depressions 53 respectively adjacent to the pivotal holes 52 of the indentation portion 51. The positioning mechanism includes a rear plate 71 surrounding each of the pivotal shafts 7, and the rear plate 71 has a protrusion 711 formed thereon according to the two depressions 53 on the indentation portion 51. One shaft end of each of the pivotal shafts 7 is fastened to the inner upper corner position each of the keyboard half portions 61, 62, and another shaft end of each of the pivotal shafts 7 is pivotally connected to each of the pivotal holes 52 of the portable electronic device body 5. The pivotal shafts are tightly fitted to two keyboard half portions 61, 62. Further, the protrusion 711 of the rear plate 71 acts upon each depression 53 on the indentation portion 51. When the two keyboard half portions 61, 62 are folded, the protrusion 711 is jammed into one of the two depressions 53 for location, and when the two keyboard half portions 61, 62 are unfolded, the protrusion 711 is jammed into another of the two depressions 53 for location, thereby to achieve a folding locating effect or a unfolding locating effect.

Figure 6:
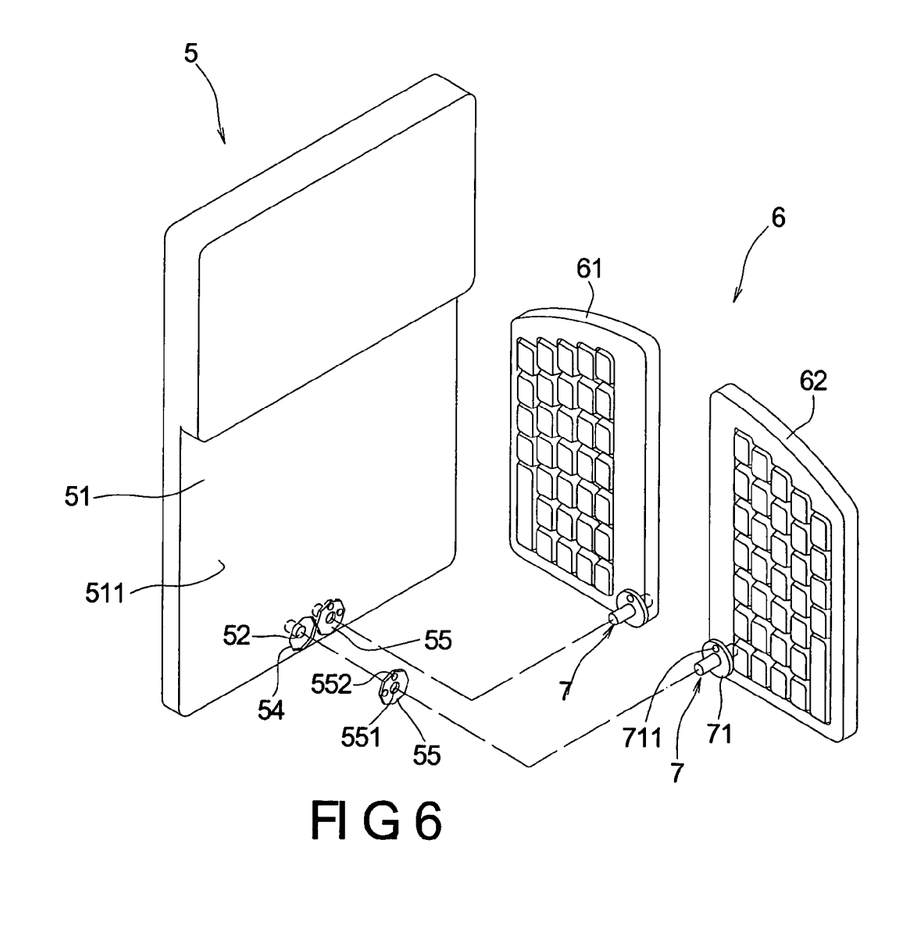
FIG. 6 is a rear exploded view of the portable electronic device of the present invention.
Figure 7:
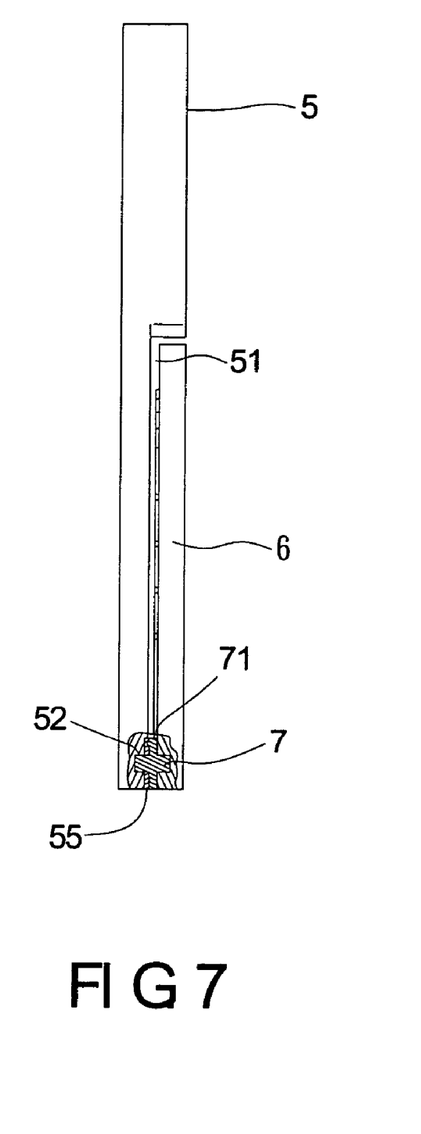
FIG. 7 is a side view of the portable electronic device of the present invention when folded.
Figure 8:
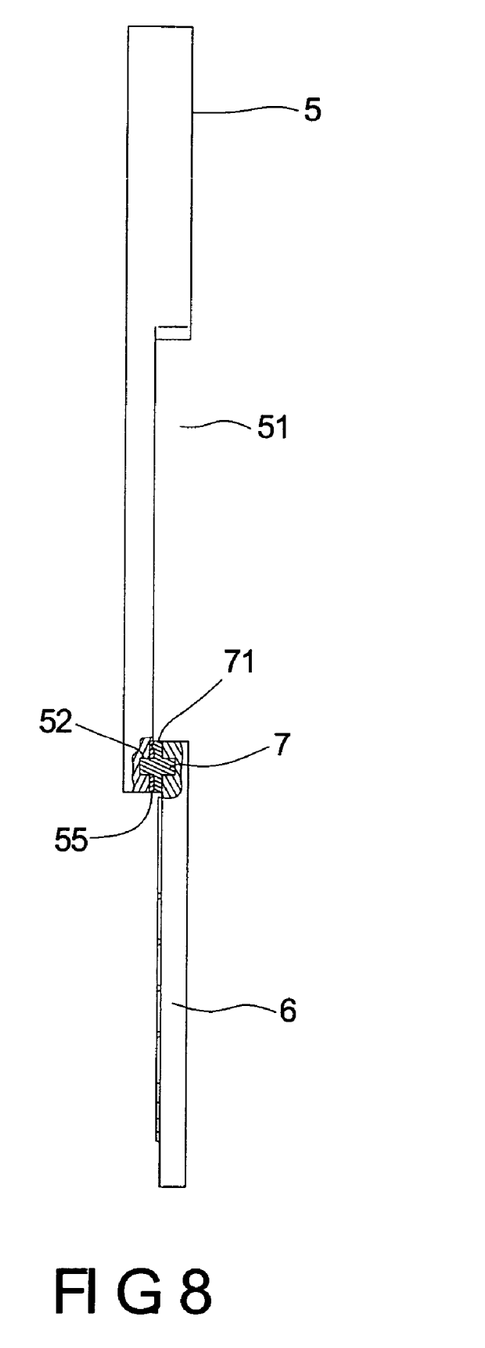
FIG. 8 is a side view of the portable electronic device of the present invention when unfolded.

With reference to FIGS. 6–8, the positioning mechanism further includes a polygonal slot 54 formed in the wall face 511 and around the pivotal hole 52 of the portable electronic device body 5. The positioning mechanism includes a front plate 55 arranged within the polygonal slot 54, and the front plate 55 has shape in accord with that of the polygonal slot 54. The front plate 55 has two depressions 552 and a through hole 551 according to the pivotal hole 52, so that the front plate 55 and the rear plate 71 can be stacked in connection with each other. The protrusion 711 of the rear plate 71 can be jammed into any one of the two depressions 552, thereby to achieve a folding locating effect or a unfolding locating effect. In FIG. 7, when the two keyboard half portions 61, 62 are folded within the indentation portion 51, they are aligned with a rear face of the portable electronic device body 5. In FIG. 8, after the two keyboard half portions 61, 62 are unfolded, they are placed on a plane (such as a surface of the table).

Figure 9:
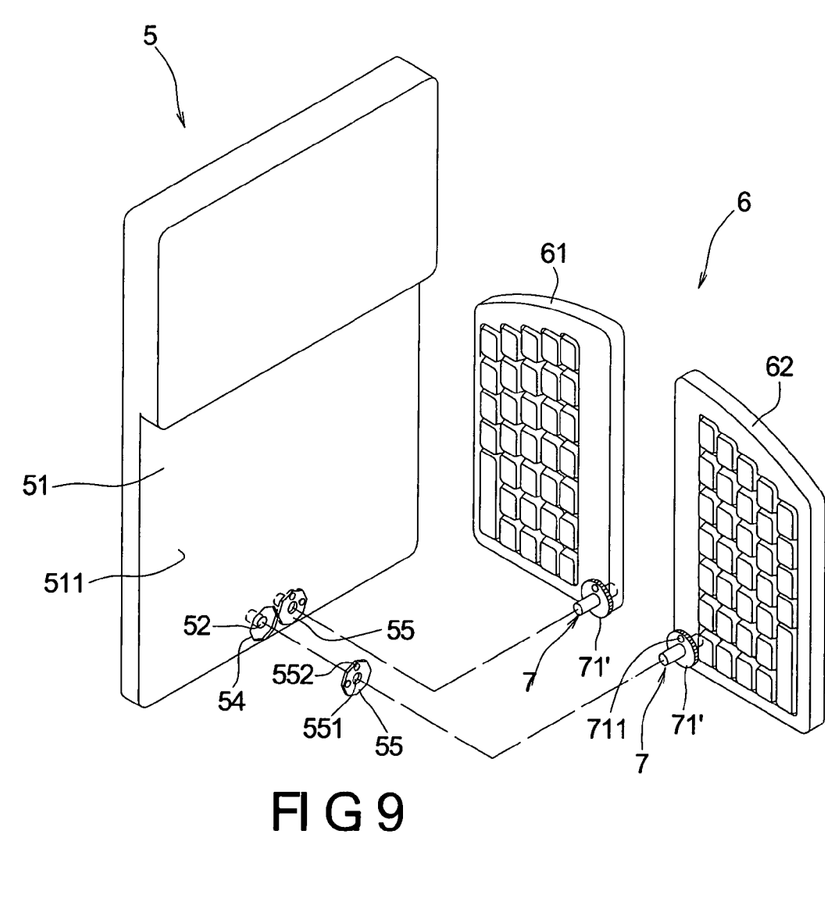
FIG. 9 is a rear exploded view illustrating an embodiment of a linking mechanism in accordance with the present invention.
Figure 10:
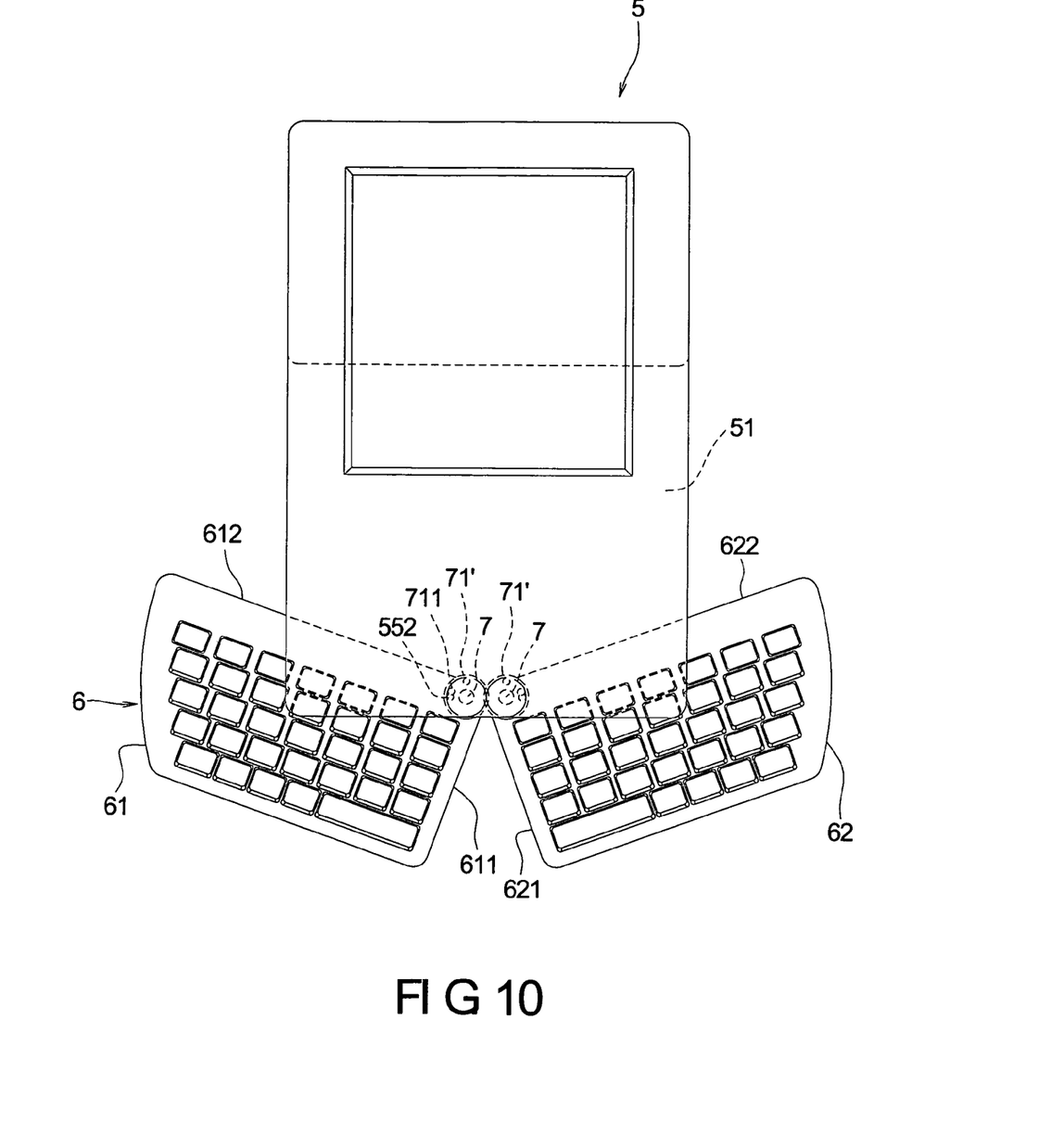
FIG. 10 is a schematic view of the portable electronic device of the present invention in operating condition.

With reference to FIGS. 9–10, the rear plates 71 of the pivotal shafts 7 respectively have two gear-shaped circumferences engaged and linked to each other. Therefore, by only operating one of the keyboard half portions 61, 62, the other of the keyboard half portions 61, 62 is simultaneously moved to fold or unfold. Such rear plates 71 of the pivotal shafts 7 can be construed as a linking mechanism.

The pivotal shafts 7 of the present invention are hollow bodies allowing signal cables (not shown) of the keyboard half portions 61, 62 to pass therethrough, and the signal cables are electrically connected to an inner circuit of the portable electronic device body 5.

To sum up, the present invention provides a portable electronic device having the objects and advantages set forth below:

1. When not in use, the keyboard half portions 61, 62 can be completely hidden within the indentation portion 51 of the portable electronic device body 5. Furthermore, the outward appearance and size of the portable electronic device are not affected, and the portable electronic device is rather convenient to carry because its outward appearance is still the same as that of a conventional portable electronic device.

2. When using, the keyboard half portions 61, 62 can be unfolded for assembly as a complete keyboard. Furthermore, it is conveniently folded or unfolded, and it is easier to type because provides a qwerty-type keyboard with the larger keys after being unfolded.

3. It will provide an extremely high utilization worth for the industry, within a limited cost.

4. Through the positioning mechanism, it has a locating effect in folding or unfolding of the keyboard half portions 61, 62.

5. Through the linking mechanism, it is conveniently operated in simultaneously being moved to fold or unfold of the keyboard half portions 61, 62.

There has thus been described a new, novel and heretofore unobvious portable electronic device which eliminates the aforesaid problem in the prior art. Furthermore, those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A portable electronic device with a hidden keyboard, comprising:
    a portable electronic device body having an indentation portion formed in a rear thereof and a pair of pivotal holes formed near a lower outer side of the portable electronic device body and in the indentation portion;
    a keyboard body having two keyboard half portions separate from each other; and
    a pair of pivotal shafts connected between the pivotal holes of the portable electronic device body and inner upper corner positions of the keyboard half portions, respectively.

2. The portable electronic device of claim 1, wherein each pivotal shaft has two shaft ends, one shaft end is fastened to an inner upper corner position of the keyboard half portion, and another shaft end is pivotally connected to the pivotal holes of the portable electronic device body.

3. The portable electronic device of claim 1, wherein the keyboard half portions are pivotable about the pivotal shafts between a storage position and a use position, the keyboard half portions being covered by the indentation portion of the electronic device body when in the storage position.

4. The portable electronic device of claim 1, wherein the keyboard half portions extend beyond the lower outer side of the portable electronic device body when in a use position and are covered by the portable electronic device body when in a storage position.

5. The portable electronic device of claim 1, wherein the keyboard half portions have rows of keys which are longitudinally aligned between the keyboard half portions when the keyboard half portions are in a use position.

6. The portable electronic device of claim 1, wherein the indentation portion is fixed and non-movable relative to the portable electronic device body.

7. The portable electronic device of claim 2, wherein the indentation portion of the portable electronic device body has a wall face, and the pivotal holes are formed in the wall face of the indentation portion.

8. The portable electronic device of claim 2, wherein the pivotal shafts are tightly fitted into two keyboard half portions and have rear plates surrounding thereon, respectively, and the rear plate have two gear-shaped circumferences engaged with each other.

9. The portable electronic device of claim 3, wherein each of the keyboard half portions have a top edge and an inner edge, the top edges of the keyboard half portions abut when the keyboard half portions are in the storage position and the inner edges of the keyboard half portions abut when the keyboard half portions are in the use position.

10. The portable electronic device of claim 3, wherein each of the keyboard half portions have a top edge which abut one when the keyboard half portions are in the storage position.

11. The portable electronic device of claim 4, wherein the portable electronic device body has a face on a side opposed to the rear having the indentation portion, all of the face of the portable electronic device body being exposed when the keyboard half portions are in the use position.

12. The portable electronic device of claim 5, wherein the rows of keys are covered by the indentation portion of the portable electronic device body when in a storage position.

13. The portable electronic device of claim 7, further comprising a positioning mechanism including two depressions respectively adjacent to the pivotal holes of the indentation portion, a rear plate surrounding each of the pivotal shafts and a protrusion formed on the rear plate, wherein the rear plate is stackedly connected to the wall face of the portable electronic device body, and when the two keyboard half portions are folded, the protrusion is jammed into one of the two depressions for location, when the two keyboard half portions are unfolded, the protrusion is jammed into another of the two depressions for location.

14. The portable electronic device of claim 7, further comprising a positioning mechanism including a front plate arranged on the wall face and having a through hole in communication with the pivotal hole, two depressions formed on the front plate, a rear plate surrounding each of the pivotal shafts and a protrusion formed on the rear plate, and the rear plate stackedly connected to the front plate, wherein when the two keyboard half portions are folded, the protrusion is jammed into one of the two depressions for location, and when the two keyboard half portions are unfolded, the protrusion is jammed into another of the two depressions for location.

15. The portable electronic device of claim 9, wherein the top and inner edges of each keyboard half portion are perpendicular to one another.

16. The portable electronic device of claim 13, wherein the two rear plates of the pivotal shafts respectively have two gear-shaped circumferences engaged with each other.

17. The portable electronic device of claim 14, wherein the two rear plates of the pivotal shafts respectively have two gear-shaped circumferences engaged with each other.

* * * * *